H. Rosamyer,
Lock Nut.
No. 93,230.        Patented Aug 3. 1869.
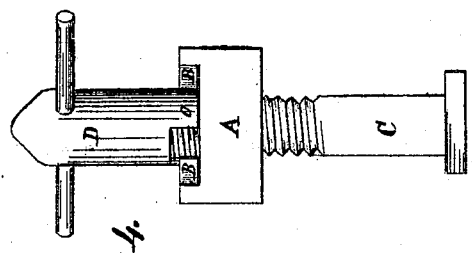
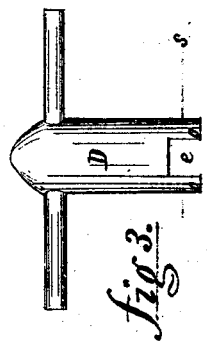
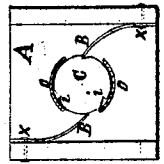
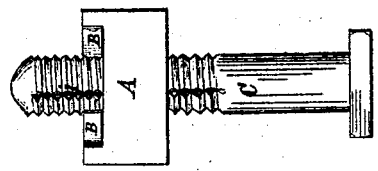

United States Patent Office.

HENRY ROSAMYER, OF ROCHESTER, PENNSYLVANIA.

Letters Patent No. 93,230, dated August 3, 1869.

IMPROVEMENT IN LOCK-NUTS.

The Schedule referred to in these Letters Patent and making part of the same.

*To all whom it may concern:*

Be it known that I, HENRY ROSAMYER, of Rochester, in the county of Beaver, and State of Pennsylvania, have invented a new and useful Improvement in Lock-Nut for Bolts; and I do hereby declare that the following is a full, clear, and exact description thereof, reference being had to the accompanying drawings, and to the letters of reference marked thereon.

The nature of my invention consists in providing a screw-nut for bolts, with a spring or springs, which is or are so arranged, with relation to the opening in the nut, that said spring or springs will catch in a recess or recesses made in the bolt, and thereby prevent the nut from turning back off the bolt.

To enable others skilled in the art to make and use my invention, I will proceed to describe its construction and operation.

In the accompanying drawings, which form part of my specification—

Figure 1 is a side elevation of a bolt, provided with my improvement in lock-nuts.

Figure 2 is a top or end view of the same.

Figure 3 is a side elevation of a key used for unshipping the springs from out of the recesses in the bolt.

Figure 4 represents the key placed over the end of the bolt, for unshipping the springs.

In the drawings—

A represents the lock-nut, provided with springs B, one end of which is secured to the nut as indicated at $x$ in fig. 2.

C represents an ordinary bolt, in the sides of which are recesses or grooves $i$, which run lengthways of the bolt.

D represents the key used for unshipping the springs B. The shank of the key D is provided with recesses $e$, for the purpose of allowing the key to pass down over springs B.

The relation of the recesses $e$, in the shank of the key, to the springs, is clearly shown at O, in fig. 2, the parts O being sections of the shank of the key, when cut through at line S, shown in fig. 3.

The recesses in the sides of the bolt C should extend along the sides of the bolt, nearly the whole length of the screw-threads.

The nut A may be recessed out, as shown in the accompanying drawings, so as to form a guard for the springs, or the springs may be placed on the outer surface of the end of the nut.

The operation of removing the nut is as follows:

The key D is placed over the end of the bolt, as shown in fig. 4. It is then turned one-fourth way round, which will bring the parts O of the shank of the key in contact with the springs B, and force them out of the recesses $i$ of the bolt. The nut is then removed from the bolt by any known means.

I do not claim, as part of my invention, providing the screw-threads of bolts with ratchet-teeth; neither do I claim providing a screw-nut for bolts, with a ratchet-pawl or a spring-ratchet, for these devices are well known.

Having thus described the nature, construction, and operation of my improvement,

What I claim as of my invention, is—

A screw-nut for bolts, when said nut is recessed as herein described, and provided with springs, for catching in recesses in the bolt, and thereby preventing any back movement of the nut.

HENRY ROSAMYER.

Witnesses:
DAVID STEWART,
JAMES J. JOHNSTON.